US012713383B2

(12) United States Patent
Liu

(10) Patent No.: US 12,713,383 B2
(45) Date of Patent: Aug. 18, 2026

(54) COMMUNICATION METHOD AND APPARATUS

(71) Applicant: GUANGDONG OPPO MOBILE TELECOMMUNICATIONS CORP., LTD., Dongguan (CN)

(72) Inventor: Yang Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 224 days.

(21) Appl. No.: 18/511,263

(22) Filed: Nov. 16, 2023

(65) Prior Publication Data

US 2024/0089898 A1 Mar. 14, 2024

Related U.S. Application Data

(63) Continuation of application No. PCT/CN2021/105821, filed on Jul. 12, 2021.

(51) Int. Cl.
*H04W 64/00* (2009.01)
*H04L 5/00* (2006.01)
*H04W 24/10* (2009.01)

(52) U.S. Cl.
CPC .......... *H04W 64/00* (2013.01); *H04L 5/0051* (2013.01); *H04W 24/10* (2013.01)

(58) Field of Classification Search
CPC ..... H04W 64/00; H04W 24/10; H04W 48/12; H04L 5/0051; G01S 5/021; G01S 5/0236
See application file for complete search history.

(56) References Cited

U.S. PATENT DOCUMENTS 10,845,453 B2 11/2020 Markhovsky
11,191,056 B2 11/2021 Fischer
11,698,463 B2 * 7/2023 Wei ......................... G01S 19/34 342/357.42
11,831,679 B2 * 11/2023 Bouthemy ......... H04B 7/18565
11,832,209 B2 * 11/2023 Tsuda .................... G01S 5/0284
2012/0268322 A1 10/2012 Takahashi
2019/0086555 A1 * 3/2019 Chandrasekar ......... H04W 4/02
(Continued)

FOREIGN PATENT DOCUMENTS

CN 102472819 A 5/2012
CN 101925104 B 11/2014
(Continued)

OTHER PUBLICATIONS

First Office Action of the European application No. 21949575.1, issued on Apr. 16, 2025, 5 pages.
Supplementary European Search Report in the European application No. 21949575.1, mailed on Jul. 5, 2024. 8 pages.
(Continued)

*Primary Examiner* — Siu M Lee
(74) *Attorney, Agent, or Firm* — Ladas & Parry LLP

(57) ABSTRACT

Provided are a communication method and a communication apparatus. The communication method includes that: a terminal device receives first information from a network device, the first information being used for indicating a validity condition of assistance information configured by the network device for the terminal device, and the assistance information being used for positioning; and the terminal device determines, according to the first information, whether the assistance information is valid when performing the positioning.

20 Claims, 7 Drawing Sheets

(56) References Cited

U.S. PATENT DOCUMENTS

| | | | | |
|---|---|---|---|---|
| 2019/0285722 | A1 | 9/2019 | Markhovsky | |
| 2020/0053690 | A1* | 2/2020 | Fischer | G01S 19/05 |
| 2020/0120578 | A1 | 4/2020 | Shreevastav | |
| 2020/0383080 | A1* | 12/2020 | Sharma | H04W 76/10 |
| 2021/0212124 | A1* | 7/2021 | Wakabayashi | G01S 19/05 |
| 2023/0148057 | A1* | 5/2023 | Dong | G01S 5/0236 455/456.1 |

FOREIGN PATENT DOCUMENTS

| | | | |
|---|---|---|---|
| CN | 110913327 | A | 3/2020 |
| CN | 111726800 | A | 9/2020 |
| CN | 112237030 | A | 1/2021 |
| CN | 112339299 | A | 2/2021 |
| CN | 112449299 | A | 3/2021 |
| CN | 112534877 | A | 3/2021 |
| WO | 2021027650 | A1 | 2/2021 |

OTHER PUBLICATIONS

Vivo, "Discussion on UE based positioning in idle/inactive states", 3GPP TSG RAN WG1 #97 R1-1906181 Reno, USA, May 13-17, 2019, the whole document. 2 pages.

International Search Report in the international application No. PCT/CN2021/105821, mailed on Apr. 15, 2022. 6 pages with English translation.

Written Opinion of the International Search Authority in the international application No. PCT/CN2021/105821, mailed on Apr. 15, 2022. 9 pages with English translation.

3GPP TS 38.331 V16.1.0 (Jun. 2020 ), 3rd Generation Partnership Project; Technical Specification Group Radio Access Network; NR; Radio Resource Control (RRC) protocol specification, (Release 16). Page 304, 7.1.1. 902 pages.

3GPP TS 38.321 V16.0.0 (Mar. 2020), 3rd Generation Partnership Project; Technical Specification Group Radio Access Network; NR; Medium Access Control (MAC) protocol specification, (Release 16). 5.1 random access procedure. 140 pages.

Second Office Action of the European application No. 21949575.1, issued on Oct. 2, 2025.

* cited by examiner

COMMUNICATION METHOD AND APPARATUS

CROSS-REFERENCE TO RELATED APPLICATION

This application is a continuation of International Patent Application No. PCT/CN2021/105821 filed on Jul. 12, 2021, the content of which is incorporated herein by reference in its entirety.

BACKGROUND

Traditional positioning methods include a triangulation ranging positioning, a Time Difference of Arrival (TDOA) positioning, an Angle of Arrival (AOA) positioning, an Enhanced Cell-ID (E-CID) positioning and so on. When a downlink positioning is applied (i.e., a terminal device performs measurement on downlink reference signals), the terminal device needs to measure measurement reference signals transmitted by Transmission reception points (TRP) located at different positions in order to measure angles, distances, and other reference information for determining positions. In order to achieve this purpose, a network device needs to transmit reference signal resources (such as frequency and bandwidth) of each TRP and positioning information of each TRP itself to the terminal device as assistance information.

In existing positioning methods, when certain conditions are satisfied (for example, when an event is detected or a periodic clock expires), the terminal device will enter a positioning stage. In each positioning step, the terminal device needs to acquire assistance information once.

However, the terminal device needs to acquire the assistance information from the network device immediately when there is a positioning demand every time, which causes an unnecessary delay when the terminal device or the network device acquires the positioning.

SUMMARY

The present disclosure relates to the field of communication technology, and in particular to a communication method and a communication apparatus.

Embodiments of the present disclosure provide a communication method and a communication apparatus so as to solve the problem of delay in acquiring the positioning in the related art.

In a first aspect of the present disclosure, there is provided a communication method, which includes the following operations. A terminal device receives first information from a network device, the first information being used for indicating a validity condition of assistance information configured by the network device for the terminal device, and the assistance information being used for positioning. The terminal device determines whether the assistance information is valid according to the first information.

In a second aspect of the present disclosure, there is provided a communication method, which includes the following operations. A network device configures first information, the first information being used for indicating a validity condition of assistance information, and the assistance information being used for positioning. The network device transmits the first information to a terminal device.

In a third aspect of the present disclosure, there is provided a terminal device, which includes: a processor, and a transmitter. The processor and the transmitter are configured to execute the communication method as described in the first aspect.

In a fourth aspect of the present disclosure, there is provided a network device, which includes: a processor, and a transmitter. The processor and the transmitter are configured to execute the communication method as described in the second aspect.

In the communication method and apparatus provided by the embodiments of the present disclosure, a terminal device receives first information from a network device first, the first information being used for indicating a validity condition of assistance information configured by the network device for the terminal device, and the assistance information being used for positioning. Then, according to the first information, the terminal device determines whether the assistance information is valid when performing positioning. In this way, when the terminal device needs to acquire the positioning, it may be determined whether the acquired assistance information is valid according to the first information. Before the validity of the assistance information expires, the terminal device uses the acquired assistance information to acquire the positioning without re-acquiring assistance information, thereby reducing the delay for acquiring the positioning.

BRIEF DESCRIPTION OF THE DRAWINGS

In order to explain technical solutions of the present disclosure or the related art more clearly, desirable accompanying drawings in the description of the embodiments and the related art will be introduced simply below. It is apparent that the drawings in the below description are some embodiments of the present disclosure, and other drawings may be acquired based on these drawings by those skilled in the art without creative efforts.

DETAILED DESCRIPTION

Figure 1:
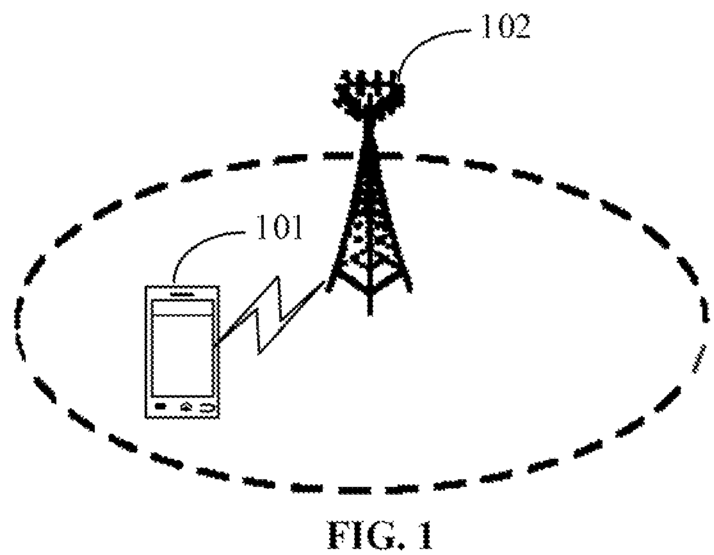
FIG. 1 is a schematic diagram of a scenario of a communication method provided by an embodiment of the present disclosure.

In order to make the purpose, technical solution and advantages of the present disclosure clearer, the technical solution in the embodiments of the present disclosure will be described below in conjunction with the drawings in the embodiments of the present disclosure. It will be apparent that the described embodiments are only part of the embodiments of the present disclosure, but not all of them. Based on the embodiments in the present disclosure, all other embodiments obtained by those of ordinary skill in the art without creative work fall within the scope of protection of the present disclosure.

The terms “first”, “second”, etc. in the description and claims of the embodiments in the present disclosure and the above drawings are used to distinguish similar objects, and are not used to describe a particular order or priority. It should be understood that the data thus used may be interchanged where appropriate so that the embodiments in the present disclosure described herein for example may be implemented in an order other than that illustrated or described herein. In addition, the terms “including” and “having” and any variations thereof are intended to cover non-exclusive inclusion, for example, a process, a method, a system, a product, or a device that includes a series of steps or units does not need to be limited to those clearly listed, but may include other steps or units that are not clearly listed or inherent to such processes, methods, products, or devices.

It should be understood that the terms “system” and “network” of the present disclosure are often used interchangeably herein. In the present disclosure, the term “and/or” is used to describe an association relationship of associated objects, and represents that there may be three relationships. For example, A and/or B may represent the following three situations: i.e., independent existence of A, existence of both A and B and independent existence of B. In addition, the character “/” in the present disclosure generally represents that an “or” relationship is formed between the previous and next associated objects.

The technical solution of the embodiments of the present disclosure will be described below in conjunction with the drawings in the embodiments of the present disclosure. It will be apparent that the described embodiments are part of the embodiments of the present disclosure, but not all of them. Based on the embodiments in the present disclosure, all other embodiments obtained by those of ordinary skill in the art without creative work fall within the scope of protection of the present disclosure.

Traditional positioning methods include a triangulation ranging positioning, a Time Difference of Arrival (TDOA) positioning, an Angle of Arrival (AOA) positioning, an Enhanced Cell-ID (E-CID) positioning and so on. When a downlink positioning is applied (i.e., a terminal device performs measurement on downlink reference signals), the terminal device needs to measure reference signals transmitted by Transmission reception points (TRP) located at different positions in order to measure angles, distances, and other reference information for determining positions. In order to achieve this purpose, a network device needs to transmit reference signal resources (such as frequency and bandwidth) of each TRP and positioning information of each TRP itself to the terminal device as assistance information.

In existing positioning methods, when certain conditions are satisfied (for example, when an event is detected or a periodic clock expires), the terminal device will enter a positioning stage. In each positioning step, the terminal device needs to report a positioning capability and acquire the assistance information at least once.

However, the terminal device needs to acquire the assistance information from the network device immediately when there is a positioning demand every time, and the signaling interaction between the terminal device and the network device will cause an unnecessary delay when the terminal device or the network device acquires the positioning.

In order to solve the above technical problems, the embodiments of the present disclosure provide a communication method and a communication apparatus. Because the assistance information remains valid under certain conditions, the network device may configure the assistance information in advance. When the terminal device needs to acquire the positioning, it may be determined whether the acquired assistance information is valid. Before the validity of the assistance information expires, the terminal device uses the acquired assistance information to acquire the positioning without re-acquiring assistance information, thereby reducing the delay for acquiring the positioning.

The following is an example of the application scenario of the present disclosure.

FIG. 1 is a schematic diagram of a scenario of a communication method provided by an embodiment of the present disclosure. As illustrated in FIG. 1, a network device 102 configures assistance information for a terminal device 101 in advance. Meanwhile, the network device 102 also transmits first information to the terminal device 101 for indicating a validity condition of the assistance information configured by the network device 102 for the terminal device 101. Then the terminal device 101 determines whether the assistance information is valid based on the first information. In response to the assistance information being valid, the terminal device 101 uses the assistance information to perform at least one of positioning reference signal measurements or positioning. In response to the assistance information being invalid, the terminal device 101 transmits second information to the network device 102 for requesting to obtain valid assistance information.

The terminal device 101 may include, but are not limited to, satellite or cellular phones. Personal Communications System (PCS) terminals that may combine cellular radio telephones with data processing, facsimile, and data communication capabilities; PDA which may include radio telephones, pagers, Internet/Intranet access, Web browsers, notebooks, calendars, and/or global positioning system (GPS) receivers; and conventional laptop and/or handheld receivers or other electronic devices including radio telephone transceivers. The terminal device may refer to an access terminal, User Equipment (UE), a subscriber unit, a subscriber station, a mobile station, a mobile platform, a remote station, a remote terminal, a mobile device, a user terminal, a terminal, a wireless communication device, a user agent, or a user device. The access terminal may be a cellular phone, a cordless phone, a session initiation protocol (SIP) telephone, a wireless local loop (WLL) station, a personal digital assistant (PDA), a handheld device with wireless communication function, a computing device or other processing devices connected to a wireless modem, an in-vehicle device, a wearable device, a terminal device in 5G network or a terminal device in future evolved PLMN, etc.

The network device 102 may provide communication coverage for a particular geographic area and may communicate with terminal devices located within the coverage area. Optionally, the network device 102 may be a base transceiver station (BTS) in a GSM system or a CDMA system, a NodeB (NB) in a WCDMA system, an evolution NodeB (eNB or eNodeB) in an LTE system, or a wireless controller in a cloud radio access network (CRAN), or the network device may be a mobile switching center, a relay station, an access point, an in-vehicle device, a wearable device, a hub, a switch, a bridge, a router, a network device in a 5G network or a network device in a future evolved public land mobile network (PLMN), etc.

Taking the terminal device and the network device as examples, the technical solution of the embodiments of the present disclosure will be described in detail with specific embodiments. The following specific embodiments may be combined with one another and may not be repeated in some embodiments with respect to the same or similar concepts or processes.

Figure 2:
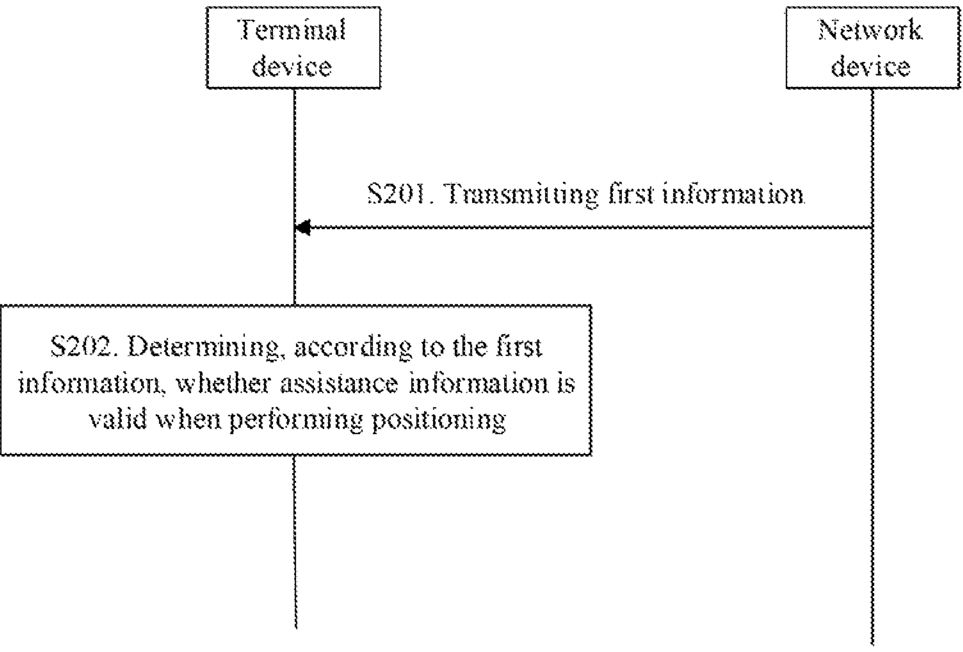
FIG. 2 is a schematic diagram of signaling interaction of a communication method provided by an embodiment of the present disclosure.

FIG. 2 is a schematic diagram of signaling interaction of a communication method provided by an embodiment of the present disclosure. The embodiment of the present disclosure relates to a process of how a terminal device determines the validity of assistance information. As illustrated in FIG. 2, the method includes the following operations S201-S202.

At S201, a network device transmits first information to a terminal device. The first information is used for indicating a validity condition of assistance information configured by the network device for the terminal device, and the assistance information is used for positioning.

In the present disclosure, the network device may configure the assistance information for the terminal device in advance, and meanwhile, the network device may also configure the first information of the assistance information, which is used to indicate the validity condition of the assistance information configured by the network device for the terminal device. After completing the configuration for the assistance information and the first information, the network device may transmit the assistance information and the first information to the terminal device.

It should be understood that the embodiments of the present disclosure do not limit how the network device transmits the first information. In some embodiments, the assistance information may include the first information, i.e. the network device transmits the first information while transmitting the assistance information to the terminal device. In other embodiments, the network device may transmit the assistance information and the first information to the terminal device, respectively.

It should be understood that the embodiments of the present disclosure do not limit how the assistance information and the first information are configured. In some embodiments, the assistance information and the first information may be configured by a Location Management Function (LMC). In other embodiments, the assistance information and the first information may be configured by a base station (gNB).

The contents of the first information will be explained below.

In an embodiment of the present disclosure, the validity condition indicated by the first information includes at least one of the following types that: the terminal device is within a valid area range, the assistance information has not expired, a number of times of performing positioning using the assistance information does not exceed a threshold of times, the terminal device has not received an update indication for the assistance information or an invalid indication for the assistance information before performing positioning, or the terminal device has received a valid indication for the assistance information before performing positioning.

For the first type of validity condition, it should be noted that the embodiments of the present disclosure do not limit how to determine that the terminal device is within the valid area range. In some embodiments, the first information may include a cell list corresponding to the valid area range or an RAN notification area list corresponding to the valid area range. Correspondingly, the terminal device being within the valid area range is determined according to whether a serving cell identification of the terminal device is in the cell list corresponding to the valid area range or in the RAN notification area list corresponding to the valid area range. If the serving cell identification of the terminal device is in the cell list or the RAN notification area list corresponding to the valid area range, it is determined that the terminal device is in the valid area range. If the serving cell identification of the terminal device is not in the cell list or in the RAN notification area list corresponding to the valid area range, it is determined that the terminal device is not in the valid area range.

For the second type of validity condition, it should be noted that the embodiments of the present disclosure does not limit how to determine that the assistance information has not expired. In some embodiments, the terminal device may determine that the assistance information satisfies the second validity condition based on that a duration of use of the assistance information does not exceed a duration of the assistance information being valid. A starting time of the duration of use of the assistance information is a time when the assistance information is received by the terminal device or a time when the assistance information is first used, and an ending time of the duration of use of the assistance information is a present time of the terminal device. Exemplarily, the duration of use of the assistance information may be determined by a timer that starts timing at the starting time of the duration of use of the assistance information and stops timing at the ending time of the duration of use of the assistance information.

The duration for which the assistance information is valid is configured by the network device or is inherent to the terminal device. In some embodiments, the duration for which the assistance information is valid may be included in the first information.

For the third type of validity condition, the terminal device updates the number of times of performing positioning using the assistance information after each positioning using the assistance information, and after updating, the number of times of performing positioning using the assistance information is compared with the threshold of times. If the number of times of performing positioning using the assistance information is less than or equal to the threshold of times, the assistance information satisfies the third type of validity condition. If the number of times of performing positioning using the assistance information is greater than the threshold of times, the assistance information does not satisfy the third type of validity condition.

The threshold of times may be understood as the maximum number of times of performing positioning using the assistance information configured by the network. The threshold of times is configured by the network device or is inherent to the terminal device. In some embodiments, the threshold of times may be included in the first information.

For the fourth type of validity condition, the network device may determine whether the assistance information is valid actively, and when the assistance information is determined to be invalid, the network device may transmit an update indication for the assistance information or an invalid indication for the assistance information to the terminal device. If the terminal device does not receive an update indication for the assistance information or an invalid indication for the assistance information before performing positioning, it is determined that the assistance information satisfies the fourth type of validity condition.

The updated assistance information may be included in the update indication, so that the terminal device may update the assistance information for positioning.

For the fifth type of validity condition, the network device may determine whether the assistance information is valid actively, and when the assistance information is determined to be valid, the network device may transmit a valid indication of the assistance information to the terminal device. If the terminal device has received the valid indication for the assistance information before performing positioning, it is determined that the assistance information satisfies the fifth type of validity condition.

It should be noted that the above validity conditions provided by the embodiments of the present disclosure are only examples and do not constitute a limitation to the present disclosure. In practical application, other validity conditions may be set according to actual conditions.

At S202, according to the first information, the terminal device determines whether the assistance information is valid when performing positioning.

In this operation, the terminal device determines, according to the first information, whether the assistance information is valid when performing positioning after the first information is received by the terminal device from the network device.

It should be understood that embodiments of the present disclosure do not limit how the terminal device determines whether the assistance information is valid when performing positioning based on the first information. In some embodiments, if the terminal device satisfies all or any one of the validity conditions of the assistance information indicated by the first information, the assistance information is determined to be valid. If the terminal device does not satisfy all or any of the validity conditions of the assistance information indicated by the first information, the assistance information is determined to be invalid.

In some embodiments, if the terminal device determines that the assistance information is valid, the terminal device may use the assistance information to perform at least one of positioning reference signal measurements or positioning.

In other embodiments, if the terminal device determines that the assistance information is invalid, the terminal device may transmit second information to the network device, the second information being used for requesting to obtain valid assistance information. Correspondingly, after receiving the second information, the network device may transmit an update indication to the terminal device for updating the assistance information.

In an optional implementation, the network device may also transmit third information to the terminal device, and the third information is used to indicate whether the validity condition in the first information is valid. If the validity condition in the first information is valid, the terminal device continues to use the validity condition in the first information to determine the validity of the assistance information. If the validity condition in the first information is invalid, the terminal device stops use of the validity condition in the first information and continues to use the assistance information, or the terminal device stops use of the validity condition in the first information and stops use of the assistance information. Optionally, the terminal device may also transmit a request message to the network device for requesting the network device to transmit a new validity condition.

In the present disclosure, when the terminal device needs to acquire positioning, before a validity period of the assistance information expires, the terminal device does not need to acquire the assistance information again, but may perform positioning measurement directly according to the assistance information previously acquired by the terminal device, and then acquire a positioning result according to a positioning algorithm.

In the communication method provided by the embodiments of the present disclosure, a terminal device receives first information from a network device first, the first information being used for indicating a validity condition of assistance information configured by the network device for the terminal device. Then, according to the first information, the terminal device determines whether the assistance information is valid when performing positioning. In this way, when the terminal device needs to acquire the positioning, it may be determined whether the acquired assistance information is valid or not according to the first information. Before the validity of the assistance information expires, the terminal device uses the acquired assistance information to acquire the positioning without re-acquiring assistance information, thereby reducing the delay for acquiring the positioning.

On the basis of the above-described embodiments, two manners are provided below to specifically explain the process of determining the validity of the assistance information. In the first manner, the terminal device may determine whether the assistance information is valid actively according to the first information. In the second manner, the network device may indicate whether the assistance information is valid by transmitting indication information directly without the first information.

Figure 3:
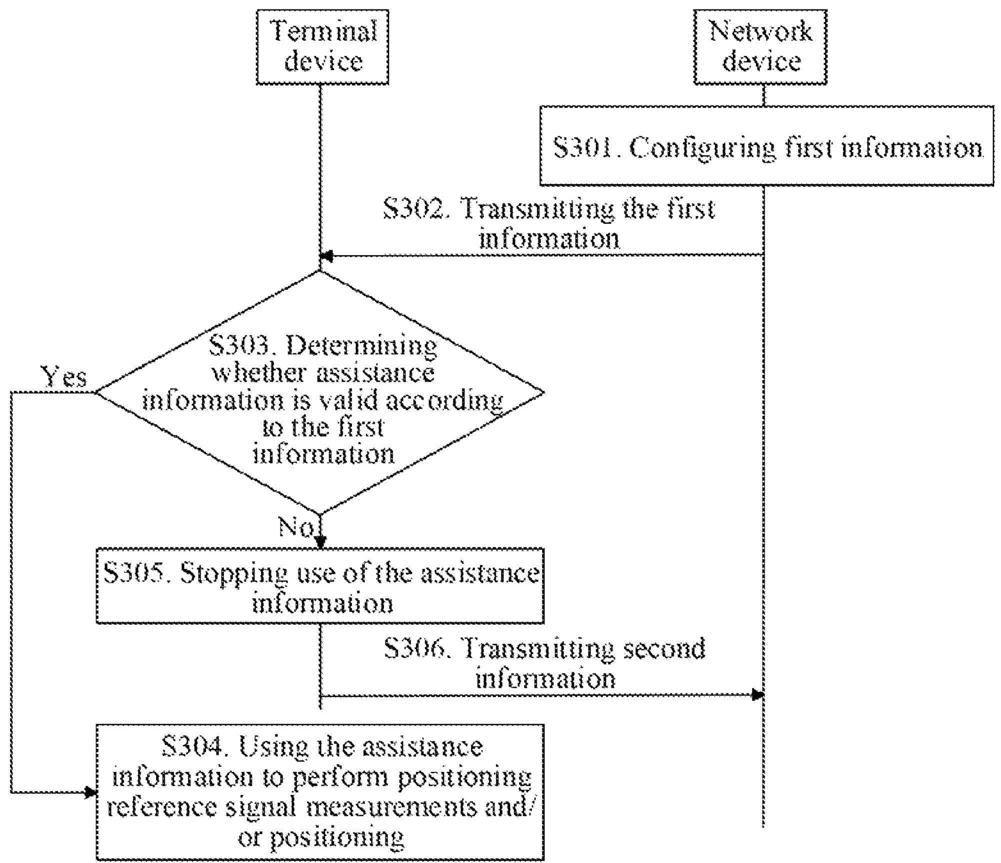
FIG. 3 is a schematic diagram of signaling interaction of another communication method provided by an embodiment of the present disclosure.

FIG. 3 is a schematic diagram of signaling interaction of another communication method provided by an embodiment of the present disclosure. The embodiment of the present disclosure related to a process of how a terminal device determines the validity of assistance information according to the first information. As illustrated in FIG. 3, the communication method includes the following operations S301-S306.

At S301, a network device configures first information. The first information is used for indicating a validity condition of assistance information configured by the network device for the terminal device, and the assistance information is used for positioning.

At S302, the network device transmits the first information to a terminal device.

At S303, the terminal device determines whether the assistance information is valid according to the first information.

If yes, i.e. the assistance information is valid, S304 is executed. If no, i.e., the assistance information is not valid, S305 is executed.

At S304, the terminal device uses the assistance information to perform positioning reference signal measurements and/or positioning.

At S305, the terminal device stops use of the assistance information.

At S306, the terminal device transmits second information to the network device. The second information is used for requesting to obtain valid assistance information.

The technical terms, technical effects, technical features and optional implementation of S301-S306 may be understood with reference to S201-S202 illustrated in FIG. 2, and the repetitive contents will not be repeated here.

Figure 4:
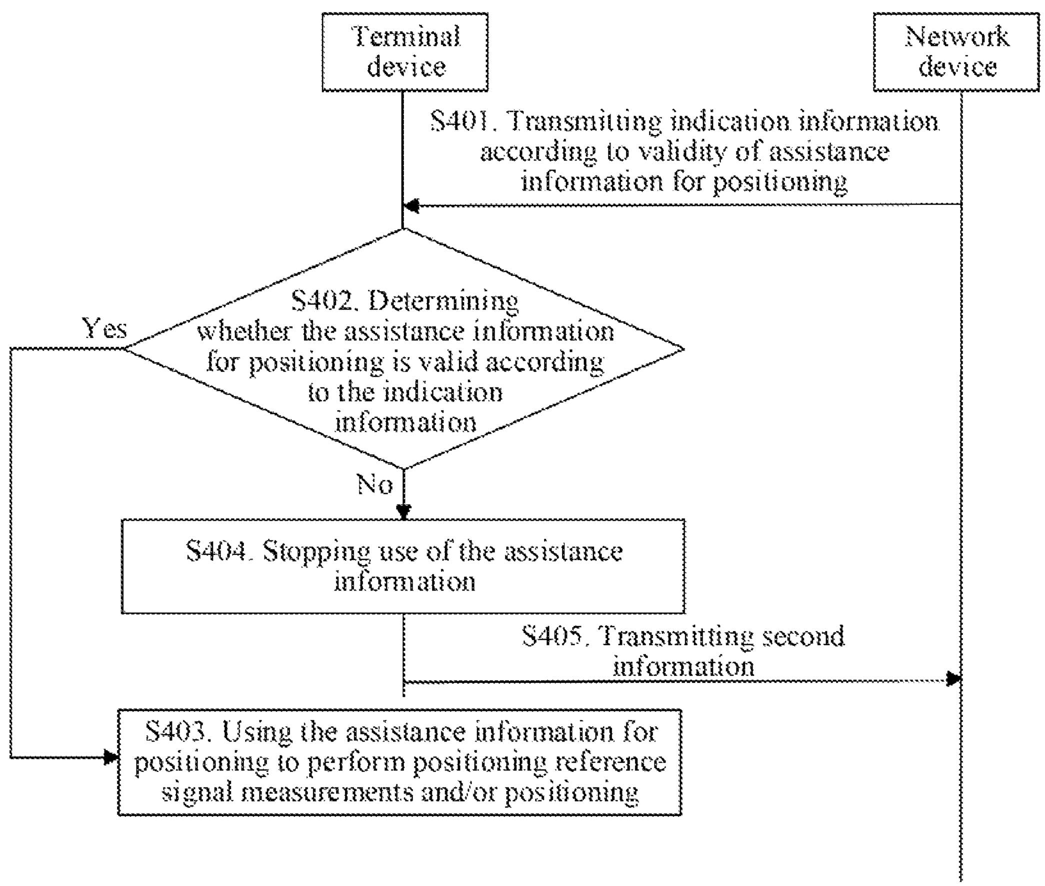
FIG. 4 is a schematic diagram of signaling interaction of yet another communication method provided by an embodiment of the present disclosure.

FIG. 4 is a schematic diagram of signaling interaction of yet another communication method provided by an embodiment of the present disclosure. The embodiment of the present disclosure relates to a process in which the network device indicates whether the assistance information is valid by transmitting indication information, as illustrated in FIG. 4. The communication method includes the following operations S401-S403.

At S401, the network device transmits indication information to the terminal device according to a validity of the assistance information. The indication information for validity is used to indicate that the assistance information is valid, or the indication information for validity is used to indicate that the assistance information is invalid, or the indication information for validity is used to indicate that the assistance information needs to be updated.

In some embodiments, if the assistance information for the terminal device does not satisfy the validity, the terminal device may transmit second information to the network device, the second information being used for requesting to obtain valid assistance information. Then, the network device transmits indication information to the terminal device to indicate the terminal device to update the assistance information.

In some embodiments, in response to determining that the assistance information is valid, the network device transmits indication information to the terminal device to indicate that the assistance information is valid.

In some embodiments, in response to determining that the assistance information is invalid, the network device transmits indication information to the terminal device to indicate that the assistance information is invalid. Optionally, the indication information may also be used to update the assistance information.

At S402, the terminal device determines whether the assistance information is valid according to the indication information.

If yes, i.e., the assistance information is valid, S403 is executed. If no, i.e., the assistance information is not valid, S404 is executed.

At S403, the terminal device uses the assistance information to perform at least one of positioning reference signal measurements or positioning.

At S404, the terminal device stops use of the assistance information.

At S405, the terminal device transmits second information to the network device. The second information is used for requesting to obtain valid assistance information.

The technical terms, technical effects, technical features and optional implementation of S401-S405 may be understood with reference to S201-S202 illustrated in FIG. 2, and the repetitive contents will not be repeated here.

Those of ordinary skill in the art will appreciate that all or part of the operations of implementing the above method embodiments may be accomplished by hardware related to program information, the aforementioned program may be stored in a computer readable storage medium, and when the program is executed, the operations including the above method embodiments are executed. The aforementioned storage medium includes various medium capable of storing program codes such as ROM, RAM, magnetic disk or optical disk.

Figure 5:
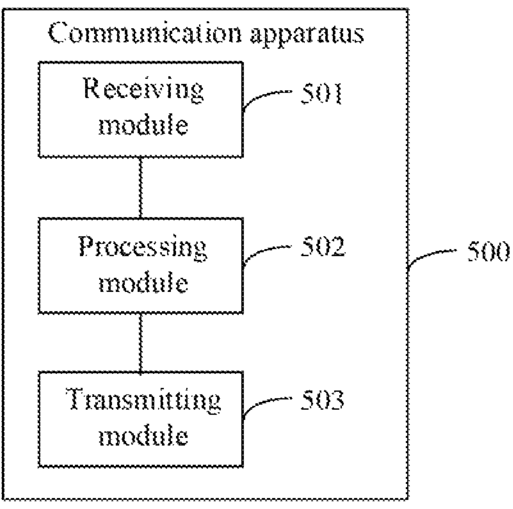
FIG. 5 is a structural diagram of a communication apparatus provided by an embodiment of the present disclosure.

FIG. 5 is a structural diagram of a communication apparatus provided by an embodiment of the present disclosure. The communication apparatus may be implemented by software, hardware, or a combination thereof to perform the communication method on the terminal device side in the above-described embodiments. As illustrated in FIG. 5, the communication apparatus 500 includes a receiving module 501, a processing module 502 and a transmitting module 503.

The receiving module 501 is configured to receive first information from a network device, the first information being used for indicating a validity condition of assistance information configured by the network device for the communication apparatus, and the assistance information being used for positioning.

The processing module 502 is configured to determine whether the assistance information is valid when the positioning is performed according to the first information.

In an optional implementation, the validity condition includes at least one of the following that: the communication apparatus is within a valid area range, the assistance information has not expired, a number of times of performing positioning using the assistance information does not exceed a threshold of times, the communication apparatus has not received an update indication for the assistance information or an invalid indication for the assistance information before performing positioning, and the communication apparatus has received a valid indication for the assistance information before performing positioning.

In an optional implementation, the communication apparatus being within the valid area range is determined according to whether a serving cell identification of the communication apparatus is in a cell list or a radio access network (RAN) notification area list corresponding to the valid area range.

In an optional implementation, the assistance information having not expired is determined according to whether a duration of use of the assistance information does not exceed a duration for which the assistance information is valid.

In an optional implementation, the duration for which the assistance information is valid is configured by the network device or is inherent to the communication apparatus.

In an optional implementation, a starting time of the duration of use of the assistance information is a time when the assistance information is received by the communication apparatus or a time when the assistance information is first used, and an ending time of the duration of the use of the assistance information is a present time of the communication apparatus.

In an optional implementation, the threshold of times is configured by the network device or is inherent to the communication apparatus.

In an optional implementation, the update indication includes updated assistance information.

In an optional implementation, the processing module 502 is specifically configured to determine that the assistance information is valid in response to the communication apparatus satisfying all or any one of the validity condition of the assistance information indicated by the first information; and determine that the assistance information is invalid in response to the communication apparatus not satisfying the all or any one of the validity condition of the assistance information indicated by the first information.

In an optional implementation, the processing module 502 is further configured to use the assistance information to perform at least one of positioning reference signal measurements or positioning in response to determining that the assistance information is valid.

In an optional implementation, the apparatus further includes a transmitting module 503.

The transmitting module 503 is configured to stop use of the assistance information and/or transmit second information to the network device in response to determining that the assistance information is invalid, the second information being used for requesting to obtain valid assistance information.

In an optional implementation, the receiving module 501 is further configured to receive third information, the third information being used for indicating whether the validity condition is valid.

The communication apparatus provided in the embodiments of the present disclosure may perform the operations of the communication method on the terminal device side in the above embodiments, and its realization principle and technical effect are similar, so it will not be described here.

Figure 6:
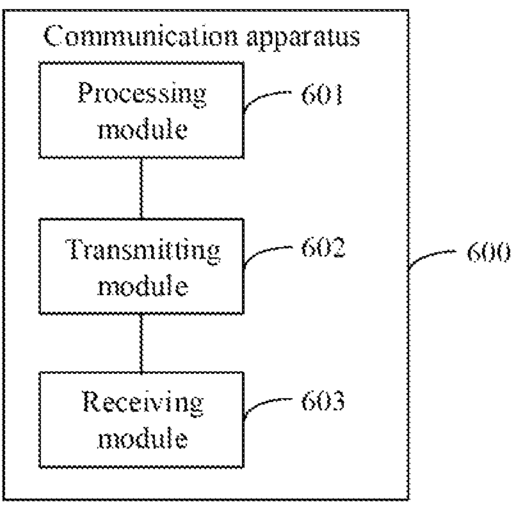
FIG. 6 is a structural diagram of another communication apparatus provided by an embodiment of the present disclosure.

FIG. 6 is a structural diagram of another communication apparatus provided by an embodiment of the present disclosure. The communication apparatus may be implemented by software, hardware, or a combination thereof to perform the communication method on the network device side in the above-described embodiments. As illustrated in FIG. 6, the communication apparatus 600 includes a processing module 601, a transmitting module 602 and a receiving module 603.

The processing module 601 is configured to configure first information, the first information being used for indicating a validity condition of assistance information, and the assistance information being used for positioning.

The transmitting module 602 is configured to transmit the first information to a terminal device.

In an optional implementation, the validity condition includes at least one of the following that: the terminal device is within a valid area range, the assistance information has not expired, a number of times of performing positioning using the assistance information does not exceed a threshold of times, the terminal device has not received an update indication for the assistance information or an invalid indication for the assistance information before performing positioning, or the terminal device has received a valid indication for the assistance information before performing positioning.

In an optional implementation, the terminal device being within the valid area range is determined according to whether a serving cell identification of the terminal device is in a cell list or in an RAN notification area list corresponding to the valid area range.

In an optional implementation, the assistance information having not expired is determined according to whether a duration of use of the assistance information does not exceed a duration for which the assistance information is valid.

In an optional implementation, the duration for which the assistance information is valid is configured by the communication apparatus or is inherent to the terminal device.

In an optional implementation, a starting time of the duration of use of the assistance information is a time when the assistance information is received by the terminal device or a time when the assistance information is first used, and an ending time of the duration of use of the assistance information is a present time of the terminal device.

In an optional implementation, the threshold of times is configured by the communication apparatus or is inherent to the terminal device.

In an optional implementation, the update indication includes updated assistance information.

In an optional implementation, the apparatus further includes a receiving module 603.

The receiving module 603 is configured to receive second information that is sent by the terminal device in response to the assistance information being invalid, the second information being used for requesting to obtain valid assistance information.

The transmitting module 602 is further configured to transmit an update indication to the terminal device, where the update indication includes updated assistance information.

In an optional implementation, the transmitting module 602 is further configured to transmit, by the communication apparatus, a valid indication for the assistance information to the terminal device in response to determining that the assistance information is valid.

In an optional implementation, the transmitting module 602 is further configured to transmit, by the communication apparatus, an invalid indication for the assistance information to the terminal device in response to determining that the assistance information is invalid.

In an optional implementation, the transmitting module 602 is further configured to transmit third information, the third information being used for indicating whether the validity condition is valid.

The communication apparatus provided in the embodiments of the present disclosure may perform the operations of the communication method on the network device side in the above embodiments, and its realization principle and technical effect are similar, so it will not be described here.

Figure 7:
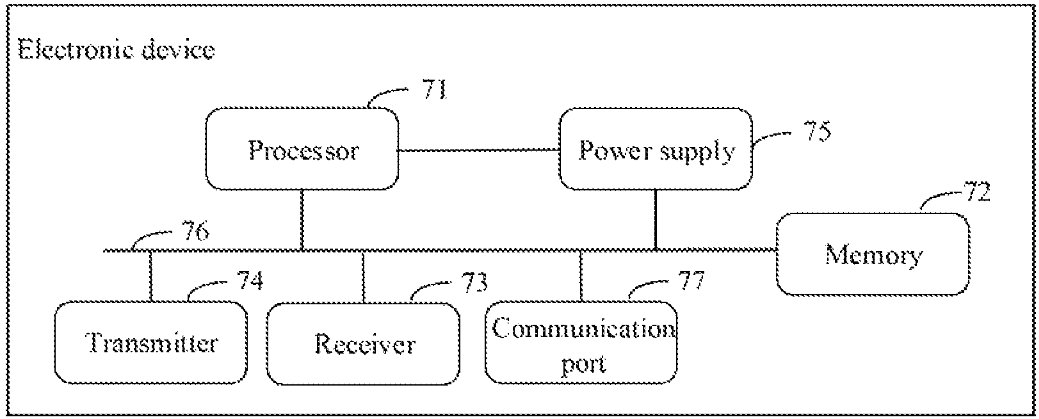
FIG. 7 is a structural diagram of an electronic device provided by an embodiment of the present disclosure.

FIG. 7 is a structural diagram of an electronic device provided by an embodiment of the present disclosure. As illustrated in FIG. 7, the electronic device may include a processor 71 (e.g. CPU), a memory 72, a receiver 73 and a transmitter 74. The receiver 73 and the transmitter 74 are coupled to the processor 71, which controls a receiving operation of the receiver 73 and controls a transmitting operation of the transmitter 74. The memory 72 may include high-speed RAM memory and may also include non-volatile memory NVM, such as at least one disk memory. The memory 72 may store various information used for completing various processing functions and implementing method operations of the embodiments of the present disclosure. Optionally, the electronic device according to the embodiments of the present disclosure may further include a power supply 75, a communication bus 76 and a communication port 77. The receiver 73 and the transmitter 74 may be integrated in the transceiver of the electronic device or may be separate transceiver antennas on the electronic device. The communication bus 76 is used to realize communication connections between the elements. The communication port 77 is used to realize connection communications between the electronic device and other peripheral devices.

In the embodiments of the present disclosure, the memory 72 is used for storing computer executable program code, which includes information. When the processor 71 executes the information, the information causes the processor 71 to perform the processing operations on the terminal device side in the above-mentioned method embodiments, causes the transmitter 74 to perform the transmitting operations on the terminal device side in the above-mentioned method embodiments, and causes the receiver 73 to perform the receiving operations on the terminal device side in the above-mentioned method embodiments. The realization principle and technical effect thereof are similar, and will not be repeated here.

Optionally, when the processor 71 executes the information, the information causes the processor 71 to perform the processing operations on the network device side in the above-mentioned method embodiments, causes the transmitter 74 to perform the transmitting operations on the network device side in the above-mentioned method embodiments, and causes the receiver 73 to perform the receiving operations on the network device side in the above-mentioned method embodiments. The realization principle and technical effect thereof are similar, and will not be repeated here.

In an embodiment of the present disclosure, there is provided a communication system, which includes a terminal device and a network device to perform the above communication method.

In an embodiment of the present disclosure, there is further provided a chip, which includes a processor and an interface. The interface is used to input and output data or instructions processed by the processor. The processor is used to perform the method provided in the above method embodiments. The chip may be applied in the terminal device or the network device.

The present disclosure also provides a computer-readable storage medium, which may include a U disk, a mobile hard disk, a Read-Only Memory (ROM), a Random Access Memory (RAM), a magnetic disk or an optical disk and other medium capable of storing program codes. In particular, the computer-readable storage medium stores program information, which is used for the above communication method.

In an embodiment of the present disclosure, there is further provided a program, when being executed by a processor, configured to perform the communication method provided by the above method embodiments.

In an embodiment of the present disclosure, there is further provided a program product, such as a computer-readable storage medium, having stored thereon instructions that, when running on a computer, cause the computer to perform the communication method provided by the above method embodiments.

In an embodiment of the present disclosure, there is provided an apparatus, which may include at least one processor and an interface circuitry, and related program instructions are executed in the at least one processor to cause the communication apparatus to implement the communication method provided by the above method embodiments.

In an embodiment of the present disclosure, there is provided a communication apparatus, configured to perform the communication method provided by the above method embodiments.

In the above-described embodiments, it may be implemented in whole or in part by a software, a hardware, a firmware or any combination thereof. When implemented in software, it may be implemented in whole or in part in the form of a computer program product. The computer program product includes one or more computer instructions. When the computer program instructions are loaded and executed on a computer, the flow or function described in accordance with embodiments of the present disclosure is generated in whole or in part. The computer may be a general purpose computer, a special purpose computer, a computer network, or other programmable devices. The computer instructions may be stored in a computer-readable storage medium, or be transmitted from one computer-readable storage medium to another. For example, the computer instructions may be transmitted from a web site, a computer, a server-side, or a data center to another web site, computer, server-side, or data center via wired (e.g. coaxial cable, optical fiber, digital subscriber line (DSL)) or wireless (e.g. infrared, wireless, microwave, etc.). The computer-readable storage medium may be any usable medium accessible to a computer or a data storage device (such as a server-side, a data center, etc.) containing one or more integrated usable medium. The usable medium may be a magnetic medium (e.g. a floppy disk, a hard disk, a magnetic tape), an optical medium (e.g. DVD), or a semiconductor medium (e.g. solid state disk (SSD)), etc.

Finally, it should be noted that the above embodiments are only used to illustrate the technical solution of the present disclosure, but do not limit it. Although the present disclosure has been described in detail with reference to the foregoing embodiments, it should be understood by those of ordinary skill in the art that the technical solution described in the foregoing embodiments may still be modified or some or all of the technical features thereof may be equivalently replaced. These modifications or replacements do not depart the essence of the corresponding technical solution from the scope of the technical solution of the embodiments of the present disclosure.

The invention claimed is:

1. A communication method, comprising:

receiving, by a terminal device, first information from a network device, the first information being used for indicating a validity condition of assistance information configured by the network device for the terminal device, and the assistance information being used for positioning, wherein the validity condition comprises that the terminal device is within a valid area range; and determining, by the terminal device according to the first information, whether the assistance information is valid when performing the positioning.

2. The method of claim 1, wherein the validity condition further comprises at least one of the following that:

the assistance information has not expired, a number of times of performing positioning using the assistance information does not exceed a threshold of times, the terminal device has not received an update indication for the assistance information or an invalid indication for the assistance information before performing positioning, or the terminal device has received a valid indication for the assistance information before performing positioning.

3. The method of claim 1, wherein the terminal device being within the valid area range is determined according to whether a serving cell identification of the terminal device is in a cell list or a radio access network (RAN) notification area list corresponding to the valid area range.

4. The method of claim 2, wherein the assistance information having not expired is determined according to whether a duration of use of the assistance information does not exceed a duration for which the assistance information is valid.

5. The method of claim 2, wherein the update indication comprises updated assistance information.

6. The method of claim 1, wherein determining whether the assistance information is valid when performing the positioning comprises:

in response to the terminal device satisfying all or any one of the validity condition of the assistance information indicated by the first information, determining that the assistance information is valid;

in response to the terminal device not satisfying the all or any one of the validity condition of the assistance information indicated by the first information, determining that the assistance information is invalid.

7. The method of claim 1, wherein after determining whether the assistance information is valid when performing the positioning, the method further comprises:

in response to determining that the assistance information is valid, using, by the terminal device, the assistance information to perform at least one of positioning reference signal measurements or positioning.

8. The method of claim 1, further comprising:

receiving, by the terminal device, third information, the third information being used for indicating whether the validity condition is valid.

9. A communication apparatus, comprising:

a receiver, configured to receive first information from a network device, the first information being used for indicating a validity condition of assistance information configured by the network device for the communication apparatus, and the assistance information being used for positioning, wherein the validity condition comprises that the communication apparatus is within a valid area range; and a processor, configured to determine, according to the first information, whether the assistance information is valid when positioning is performed.

10. The apparatus of claim 9, wherein the validity condition further comprises at least one of the following that:

the assistance information has not expired, a number of times of performing positioning using the assistance information does not exceed a threshold of times, the communication apparatus has not received an update indication for the assistance information or an invalid indication for the assistance information before performing positioning, or the communication apparatus has received a valid indication for the assistance information before performing positioning.

11. The apparatus of claim 2, wherein the communication apparatus being within the valid area range is determined according to whether a serving cell identification of the communication apparatus is in a cell list or in a radio access network (RAN) notification area list corresponding to the valid area range.

12. The apparatus of claim 10, wherein the assistance information having not expired is determined according to whether a duration of use of the assistance information does not exceed a duration for which the assistance information is valid.

13. The apparatus of claim 9, wherein the processor is specifically configured to:

determine that the assistance information is valid in response to the communication apparatus satisfying all or any one of the validity condition of the assistance information indicated by the first information; and determine that the assistance information is invalid in response to the communication apparatus not satisfying the all or any one of the validity condition of the assistance information indicated by the first information.

14. The apparatus of claim 9, wherein the processor is further configured to use the assistance information to perform at least one of positioning reference signal measurements or positioning in response to determining that the assistance information is valid.

15. The apparatus of claim 9, wherein the receiver is further configured to receive third information, the third information being used for indicating whether the validity condition is valid.

16. A communication apparatus, comprising:

a processor, configured to configure first information, the first information being used for indicating a validity condition of assistance information, and the assistance information being used for positioning, wherein the validity condition comprises that a terminal device is within a valid area range; and a transmitter, configured to transmit the first information to the terminal device.

17. The apparatus of claim 16, wherein the validity condition further comprises at least one of the following that:

the assistance information has not expired, a number of times of performing positioning using the assistance information does not exceed a threshold of times, the terminal device has not received an update indication for the assistance information or an invalid indication for the assistance information before performing positioning, or the terminal device has received a valid indication for the assistance information before performing positioning.

18. The apparatus of claim 16, wherein the terminal device being within the valid area range is determined according to whether a serving cell identification of the terminal device is in a cell list or a radio access network (RAN) notification area list corresponding to the valid area range.

19. The apparatus of claim 17, wherein the assistance information having not expired is determined according to whether a duration of use of the assistance information does not exceed a duration for which the assistance information is valid.

20. The apparatus of claim 16, wherein the transmitter is further configured to transmit third information, the third information being used for indicating whether the validity condition is valid.

* * * * *